(12) United States Patent
Kundu et al.

(10) Patent No.: US 8,440,584 B1
(45) Date of Patent: May 14, 2013

(54) METHODS FOR DECONTAMINATION OF POWDERS

(75) Inventors: Animesh Kundu, Bethlehem, PA (US); Martin P. Harmer, Trexlertown, PA (US)

(73) Assignee: Lehigh University, Bethlehem, PA (US)

( * ) Notice: Subject to any disclaimer, the term of this patent is extended or adjusted under 35 U.S.C. 154(b) by 0 days.

(21) Appl. No.: 13/334,829

(22) Filed: Dec. 22, 2011

Related U.S. Application Data

(60) Provisional application No. 61/426,647, filed on Dec. 23, 2010.

(51) Int. Cl.
*C04B 41/00* (2006.01)
(52) U.S. Cl.
USPC ............ 501/118; 501/119; 501/120; 423/600
(58) Field of Classification Search .................. 423/600; 501/118–120
See application file for complete search history.

(56) References Cited

U.S. PATENT DOCUMENTS

| | | | | |
|---|---|---|---|---|
| 3,531,308 | A * | 9/1970 | Bagley ........................... | 501/120 |
| 7,919,069 | B2 * | 4/2011 | Kundu .......................... | 423/598 |
| 2004/0266605 | A1 * | 12/2004 | Villalobos et al. ............ | 501/108 |
| 2009/0143215 | A1 * | 6/2009 | Sweeney et al. ............. | 501/96.3 |

FOREIGN PATENT DOCUMENTS

CN 1127734 * 7/1996

OTHER PUBLICATIONS

Translation of CN 1127734, Jul. 1996.*

* cited by examiner

*Primary Examiner* — Steven Bos
(74) *Attorney, Agent, or Firm* — Rhoads & Sinon LLP; Kurt Ehresman

(57) ABSTRACT

Provided herein are methods and apparatus to remove unwanted elements in commercial powders, and particularly in commercial powders that include one or more of a crystalline ceramic oxide. The methods involve treating powders in reduced pressure atmosphere, such as a vacuum, with or without heating, for a period of time sufficient to remove impurities. Impurities and contaminants, including anionic species, are removed from the powders without any undesirable changes in the physical characteristics of the starting material, such as particle size and particle size distribution, surface area, and volume, for example. The resulting purified powder starting material can be consolidated without the need for any sintering aids such as LiF to produce nearly colorless, extremely transparent polycrystalline articles that approach identical properties and performance of single crystal spinels.

19 Claims, 5 Drawing Sheets

METHODS FOR DECONTAMINATION OF POWDERS

CROSS REFERENCE TO RELATED APPLICATIONS

This application claims the benefit of U.S. Provisional Patent Application No. 61/426,647, filed Dec. 23, 2010, which is hereby incorporated by reference.

BACKGROUND OF THE INVENTION

Provided herein are methods and associated apparatus for purification of powder materials, and particularly powder materials used in making transparent articles, and more particularly for making transparent ballistic armor articles, for example.

SUMMARY OF THE INVENTION

Provided herein are methods of purifying starting materials for use in forming transparent and nearly colorless crystalline (single crystal and polycrystalline) articles suitable for use in ballistic and other impact environments.

In one example, a method provides a purified ceramic powder, the method comprising the steps of: providing a ceramic powder starting material comprising a crystalline oxide of a ceramic material and at least one chemical contaminant that is not a crystalline oxide of s ceramic material; and subjecting the ceramic powder starting material to a reduced pressure vacuum for a time sufficient to remove the at least one chemical contaminant from the starting material and to thereby provide a purified material having a purity of at least 99.9% purity, and in some cases a purity of at least 99.99 percent pure crystalline oxide by on a metals basis weight. Preferably, the method avoids any need for a sintering agent or other chemical scavenger prior to pressing or other consolidation of the purified starting material to form a nearly theoretically dense polycrystalline article.

In another example, polycrystalline articles are provided that are formed from the purified starting materials. In yet another example, the methods provide a purified starting material suitable for making a crystalline article having nearly theoretical transparency and without any color centers or tint (e.g. nearly colorless transmission of light). In this embodiment, the method comprises the steps of: providing a starting material comprising at least one crystalline ceramic oxide, the crystalline ceramic oxide being at least 98% pure by weight; and subjecting the starting material to a reduced pressure atmosphere (vacuum) and a selected temperature for a time sufficient to remove at least one chemical contaminant from the starting material and to thereby provide a purified starting material having a purity of at least 99.9% by weight.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
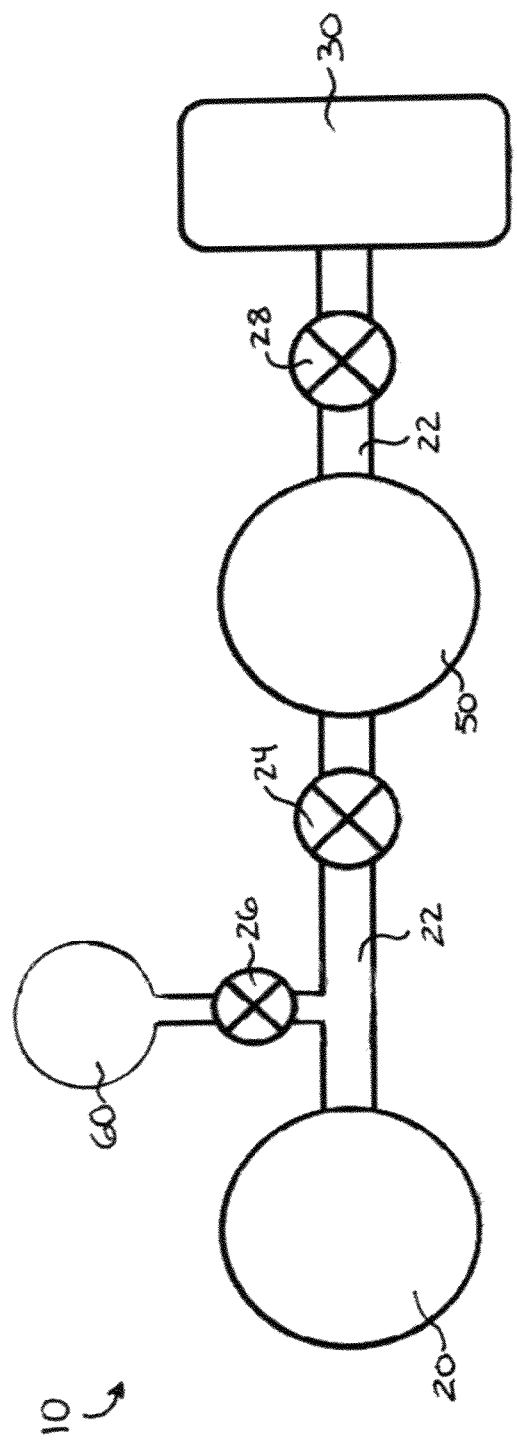
FIG. 1 is a schematic of an exemplary vacuum system useful in performing the methods of the invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Magnesium Aluminate spinel ($MgAl_2O_4$) is one suitable ceramic oxide that exhibits excellent transparency in the visible and IR-wavelength ranges. The unique combination of optical and mechanical properties in this and other crystalline oxides makes them suitable for various defense applications, such as transparent windows for armored vehicles, missile domes, and other ballistic and ballistic-defense articles. Such articles are made from crystalline powders (such as single-crystal spinels), including polycrystalline articles made by heating and pressing the powders, for example.

Because it is a cubic isotropic ceramic material, theoretically, $MgAl_2O_4$ spinel should be equally transparent in polycrystalline form as it is in the form of single crystals. However, in practice, transparent polycrystalline spinel is difficult to prepare, and has thus been an active area of research for decades, with limited success. The principal cause for degradation of transparency in the consolidated polycrystalline articles made from the powders are the presence of impurities, as well as porosity (which can be an undesirable side-effect of contaminants in the starting materials). In recent years, more desirable levels of transparency have been achieved by the use of sintering additives (such as LiF), but at the cost of excessive grain growth and degraded mechanical properties. Thus, the need for removal of contaminants from crystalline oxide starting materials, and especially without degrading the optical and mechanical properties of polycrystalline materials and articles made therefrom, remains unmet.

The purity of powders ("powders" as used herein including any small particulate, whether ground, synthesized, or otherwise sized) is often quoted in terms of cationic impurities. In commercial terms this is often referred to as "purity on metal basis". The presence of anionic impurities is most often completely ignored, and their amounts are not published by manufacturers or scientific researchers. However, the inventors have discovered that even the so called "ultra-high purity" commercial powders contain significant amount of anionic impurities, and that result in degradation of properties in parts fabricated from these powders. Some of the anionic impurities, as well as their quantitative values in commercially available powders (before and after treatment by the methods herein) are identified in Table I and Table II hereof.

The present invention concerns methods and apparatus to remove unwanted impurities in commercial powders, and particularly to remove impurities in commercial powders that include one or more of a crystalline ceramic oxide. In an example, the methods involve treating powders in a reduced atmosphere (vacuum), with or without heating (pre-heating or concurrent heating) for a period of time sufficient to remove impurities. In the methods described herein, impurities (predominantly the anionic species) are removed from the powders without any undesirable changes in the powder physical characteristics, such as particle size and particle size distribution, surface area, and volume, for example.

In an example, starting materials having a high claimed purity of more than 98% have been found to have impurities of over 1000 ppm, and sometimes as high as about 2000 ppm. Our methods herein have successfully reduced impurity levels to less than 500 ppm. In an example, we purified Baikowski International Corporation S30CR grade magnesium aluminate spinel powders, which are commercially acknowledged as one of the purest nano-sized powders (99.995% on metal basis) that is commercially available. However, the inventors discovered that even the S30CR powder has relatively large amounts of anionic impurities, and that there is a significant batch to batch variation of such impurities. We have developed a pretreatment process ("pretreatment" meaning before consolidation into a polycrystalline article) that removes or otherwise negates impurities in the S30CR powder, and that is equally applicable and adaptable to other commercial powders. The resulting purified powders can be densified to desired nearly theoretical transparency, without the need for any sintering aids (such as LiF, as further described herein). Using our method to produce purified powders, the resulting powders avoid the excessive grain growth associated with the use of sintering aids, and can be formed into transparent polycrystalline articles having unprecedented superior mechanical and optical properties. Our methods and processes can be utilized to remove anionic impurities and to otherwise purify other powders of any composition, including but not limited to ceramic oxides such as aluminum oxide ($Al_2O_3$), boron oxide ($B_6O$) and non-oxide ceramics such as boron carbide ($B_4C$).

In an example, the methods involve treating the powders (also referred to as "starting materials") under powerful vacuum. All other things being equal (composition, level of impurities, sample size, particle size, for example) between various samples of starting materials, higher vacuums shorten the treatment time required to achieve desired properties. For example, in testing using S30CR as a starting material, a vacuum of the order of $10^{-1}$ torr, for about 48 hours was a sufficient time to remove the impurities, whereas for a vacuum of about $10^{-5}$ torr, about 8 hours was been found to be sufficient to yield similar results. A vacuum of up to about $10^{-8}$ Torr is believed to be compatible with our methods and starting materials.

A point to note here is that some process parameters are dependent in and on factors such as the equipment used (and its vacuum capacity and resistance to pressure leaks), as well as amount and type of contaminant present in the starting material. Some parameters such as the vacuum level, temperature, and treatment time will be optimized based upon equipment type used. For example, vacuum and time values in the examples herein are obtained from different equipment types. For example, our earliest data first data was obtained from a hot press with vacuum, whereas later data was obtained from a dedicated prototype vacuum apparatus consistent with FIG. 1 assembled for the purpose of purification of the powders.

A schematic of a prototype vacuum purification apparatus is shown in FIG. 1. That apparatus is suitable for executing the inventive methods described herein. In this example, the apparatus 10 includes several components to subject a sample to a very high vacuum, while minimizing loss of the sample. For example, a sample of starting material is placed in sample chamber 20. Chamber 20 in this example has a volume of about 2.2 liters. Chamber 20 is communicably linked by a conduit 22 to a vacuum source such as vacuum pump 30. The conduit 22 may optionally include a filter, membrane, or other device to minimize undesirable loss of the starting material in chamber 20. The flow of any gas, vapor, air or material through conduit 22 is controlled by one or more valves 24. In this example, a cold trap 50 is also placed in communication with the conduit 22 to facilitate greater pressure reduction. Also in this example, a nitrogen source 60 is provided in controllable communication with the conduit 22 and optionally with cold trap 50. Additional valves 26, 28 are provided to permit selective opening and closing of conduit 22, such as to regulate pressure, temperature, and suction of the system 10 at selected times. System 10, and each of its elements, may be manually controlled, or may be automated such as through a computer-controlled microprocessor. Additionally, the system 10 can include sensors for determining any relevant parameter at any given time, as well as control mechanisms to adjust the parameters, including but not limited to pressure, temperature, suction, flow, chemical composition of sample and any gasses within the system 10.

Figure 3:
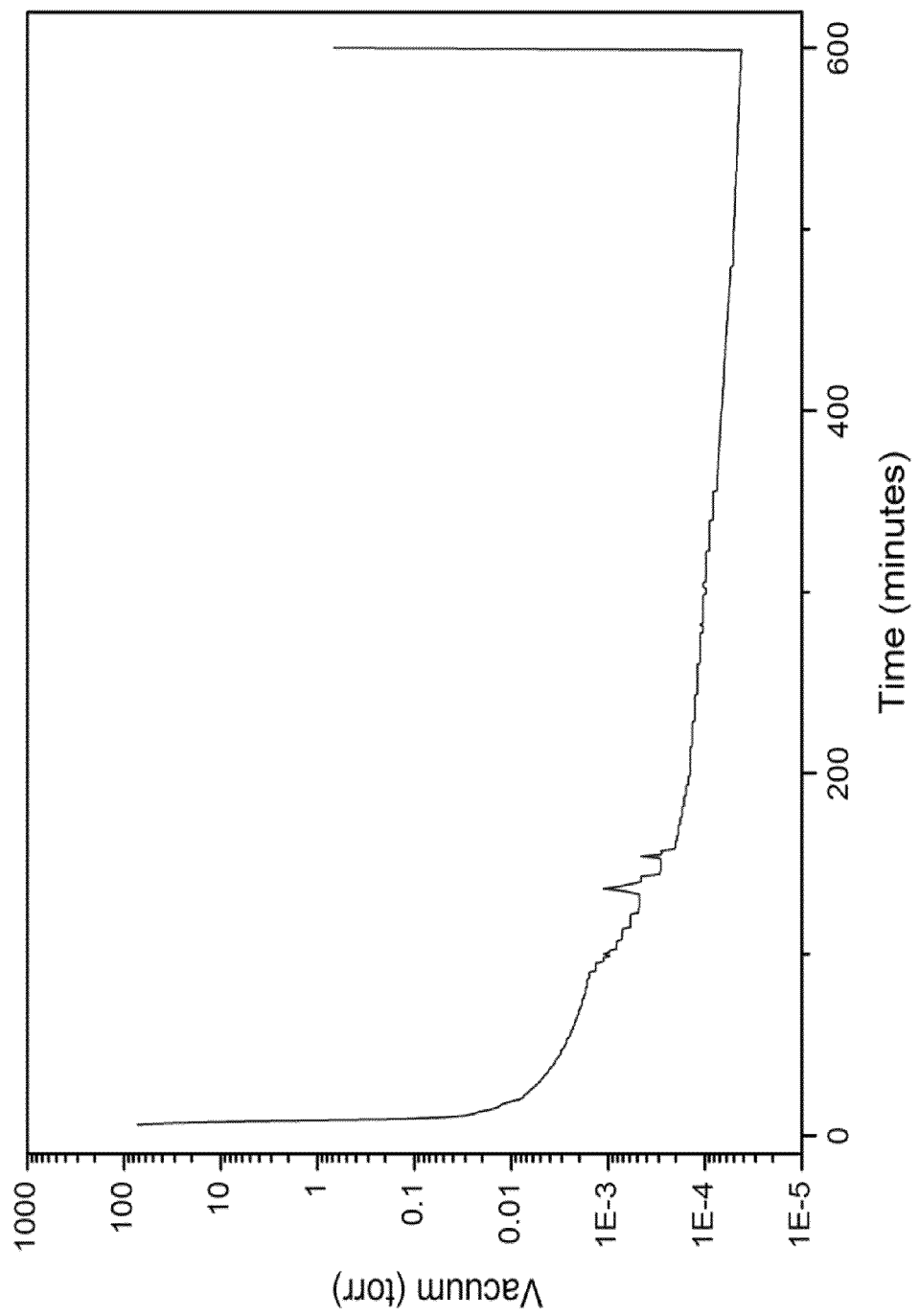
FIG. 3 is a graph showing another vacuum profile of an exemplary method in accordance with the present invention.

In an example of the inventive methods and apparatus, a typical batch of about 50 g of Baikowski S30CR powder was used in system 10. The powder was put in a Polytetrafluoroethylene (PTFE) vessel inside the sample chamber 20 and vacuum applied using vacuum pump 30 at room temperature for 8-12 hours. The time of treatment can be varied and controlled depending on the amount of contaminants present (or believed to be present) in the starting material. After the vacuum treatment, the sample chamber was backfilled with nitrogen. Then, the powder was taken out and stored in a hermetically sealed vessel to avoid any further contamination. A representative vacuum profile for a 10 hour treatment of a 50 g batch at room temperature is shown in FIG. 3, which is a chart illustrating a vacuum profile of vacuum (torr) versus time elapsed (minutes or hours) for that sample.

To determine the efficacy of the process in removing impurities from powders, in several examples herein the vacuum treated powders were identically hot-pressed to fabricate sintered discs and the density and optical properties of the discs were measured. A visual inspection of the transparency and presence of color centers in the disc was often sufficient to determine the effectiveness. However, to be sure, transmission spectra in the optical and mid IR wavelength ranges were obtained from suitable samples to quantify the efficiency. The inventors found that in each case, untreated S30CR powders produced less transparent samples as compared to articles made from the purified powders made by the methods herein. Additionally, the untreated powders exhibited a visible hue indicating the presence of color centers/impurities in the samples, whereas the treated powders produced colorless, nearly theoretically transparent samples.

EXAMPLES

Example 1

Figure 2:
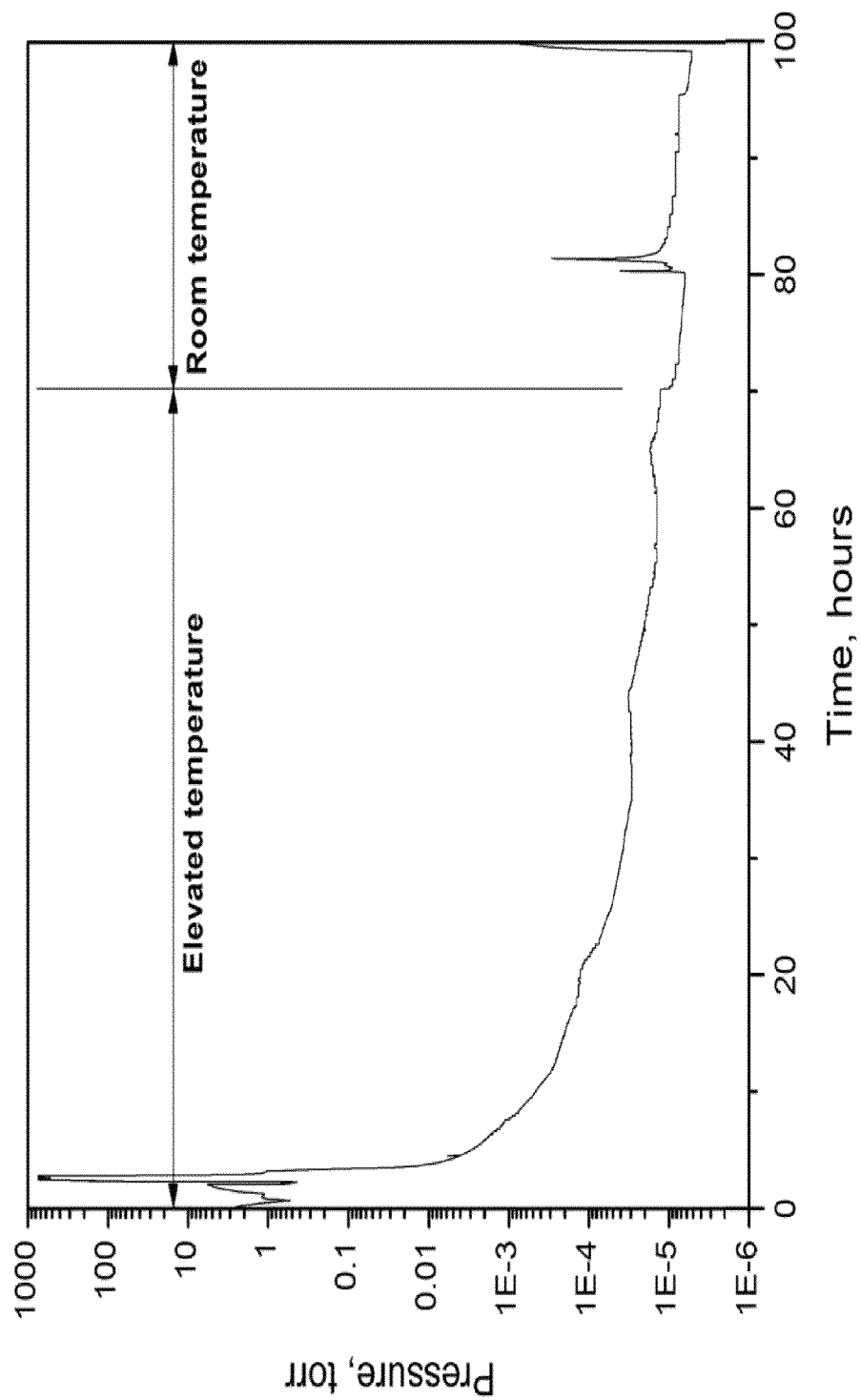
FIG. 2 is a graph showing a vacuum profile of an exemplary method in accordance with the present invention.

A sample batch of magnesium alumina spinel (Baikowski S30CR) was pretreated for 100 hours in the prototype equipment generally illustrated in FIG. 1. FIG. 2 shows the vacuum profile and concurrent times of heating for this example. As shown, for the initial 70 hours the powders were heated by externally heating the chamber at 100° C. After 70 hours, the powder was cooled down to room temperature and the vacuum process was continued for another 30 hours. The chemical analysis of the resulting treated powder was analyzed, and compared to analysis of the "as-received" (untreated) starting material powder. The results of those analyses are tabulated in Table I. As shown, the process effectively reduced the otherwise intrinsic impurities in the material.

The treated powder was then sintered by an independent firm using their proprietary process, and the transparency of a sintered piece was reported to be 71.6%. On the same scale, the transparency of a sintered piece (fabricated identically by the firm utilizing their process and using "as received" powder was reported to be about 65%. This proves that the treatment process of Example 1 removed impurities and ultimately improved the transparency of material formed from its purified powders.

Example 2

Figure 4:
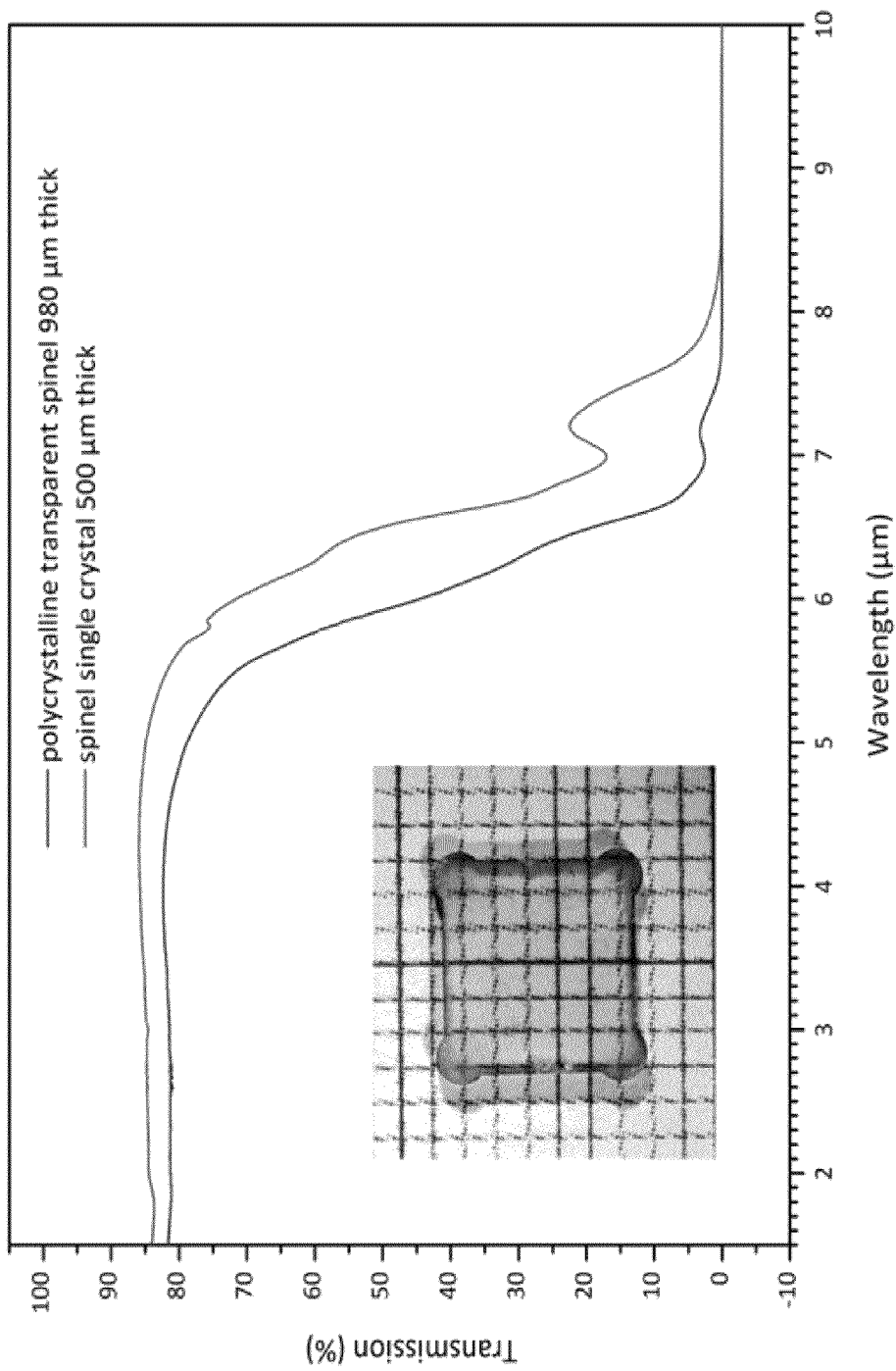
FIG. 4 is a graph showing transmission spectra of a single crystal spinel sample versus a polycrystalline article fabricated from purified powder pretreated in accordance with the present invention.

Powder batches pretreated by the methods of the exemplary methods herein were later subjected to an in-house developed sintering protocol. The results are better than those reported by the independent firm for untreated powder starting materials. The in-house sintering protocol involves a low temperature (about 200° C.) calcination of the powder in vacuum, followed by hot-pressing at 1200° C. furnace temperature under a pressure of 100 MPa. The entire operation was performed in a vacuum hot press. The pressure was slowly applied at the end of the 200° C. heating step, before the temperature was ramped to 1200° C. The specimens thus received were sectioned, polished and the transmission was measured. The results are shown in FIG. 4, along with a photographic image of the sample. For comparison, the transmission spectra of a 500 µm thick magnesium aluminate spinel single crystal (both sides epi polished) obtained under identical condition as the polycrystalline sample is also shown (as the top-most data line in FIG. 4). As shown, The transparency of the commercially available single crystal was about 85%, approaching the theoretical transparency of magnesium aluminate crystal of about 87%. The discrepancy in the transparency of that theoretically perfect single crystal sample is believed to be predominantly because of the limitations of the instrument and to a limited extent to the surface condition of the single crystal. As shown, the treated powder-produced polycrystalline magnesium aluminate sample (tested under identical conditions in the identical instrument as that for the single crystal) has a transparency more than 80%. This represents a surprising and unprecedented result for a hot-pressed sample that was fabricated without the aid of any sintering aids.

Example 3

Figure 5:
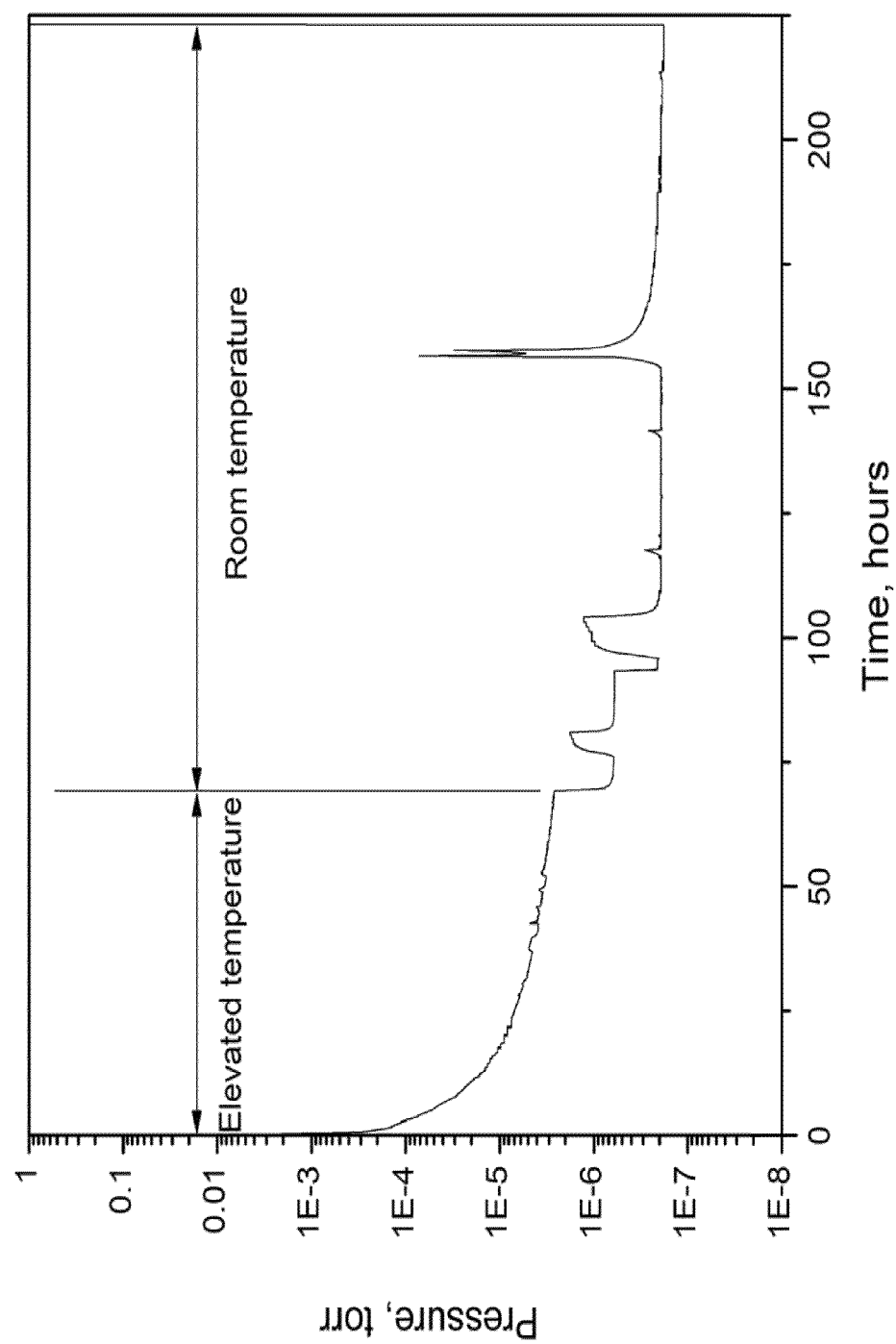
FIG. 5 is a graph showing another vacuum profile of an exemplary method in accordance with the present invention.

In this example, the pretreatment methods were applied to a batch of ~50 g of commercially available powder (Baikowski S30CR). As shown in FIG. 5, the treatment time was ~220 hours, of which the first 69 hours was performed at an elevated temperature of 125° C.; the rest of the treatment was performed at room temperature. The vacuum profile is shown in FIG. 5. The chemical analysis of the as received starting powder and the powder obtained after treatment are shown in Table 2. As shown the impurity content of the powder was reduced drastically by the treatment.

TABLE I

Chemical Analysis of the pretreated powder and the as received starting powder in an example.

| Element | Pretreated Powder Concentration [ppm wt] | As received Powder Concentration [ppm wt] |
|---|---|---|
| Li | 0.61 | 250 |
| Be | <0.1 | <0.1 |
| B | 0.2 | 0.25 |
| O | Matrix | Matrix |
| F | <5 | <5 |
| Na | 61 | 49 |
| Mg | Matrix | Matrix |
| Al | Matrix | Matrix |
| Si | 18 | 14 |
| P | 0.99 | 1.2 |
| S | 500 | 550 |
| Cl | 7.7 | 2 |
| K | 25 | 25 |
| Ca | 9.4 | 7.7 |
| Sc | <0.5 | <0.5 |
| Ti | 1.2 | 1.6 |
| V | <0.5 | <0.5 |
| Cr | <1 | 1.2 |
| Mn | <0.5 | <0.5 |
| Fe | 2.7 | 3 |
| Co | <0.1 | 0.12 |
| Ni | <0.5 | <0.5 |
| Cu | <10 | <10 |
| Zn | <1 | 8.2 |
| Ga | 10 | 11 |

TABLE II

Chemical Analysis of the pretreated powder and the as received starting powder in another example

| Element | Pretreated Powder Concentration [ppm wt] | As received Powder Concentration [ppm wt] |
|---|---|---|
| Li | 0.94 | 0.88 |
| Be | <0.1 | <0.1 |
| B | <0.1 | 1.3 |
| O | Matrix | Matrix |
| F | <5 | <5 |
| Na | 48 | 45 |
| Mg | Matrix | Matrix |
| Al | Matrix | Matrix |
| Si | 6.1 | 20 |
| P | 0.88 | 2.4 |
| S | 520 | 820 |
| Cl | <0.5 | 2.1 |
| K | 38 | 2.1 |
| Ca | 8.2 | 8.8 |
| Sc | <0.5 | <0.5 |
| Ti | 0.82 | 1 |
| V | <0.5 | <0.5 |
| Cr | <1 | +211 |
| Mn | <0.5 | <0.5 |
| Fe | 1.8 | 2.9 |
| Co | <0.1 | <0.1 |
| Ni | <0.5 | <0.5 |
| Cu | <10 | <10 |
| Zn | <1 | <1 |
| Ga | 11 | 10 |

Importantly, the methods herein avoid the need for use of sintering agents, such as lithium fluoride (LiF). Fluorides in general, and lithium fluoride in particular, has been suggested by others as a desirable additive to reduce contamination and achieve desirable transparency and density in the consolidated polycrystalline materials that are fabricated from the powder starting material. LiF is an extremely reactive chemical, and (without being limited by theory) is believed to chemically interact with contaminants on the surface of powders. Unless removed by LiF or another method (with no other viable method existing until the present invention), those surface contaminants become trapped within the polycrystalline structure, affecting color, clarity, grain structure, and other optical and other mechanical properties. LiF has been shown to reduce coloration in polycrystalline articles when used as a sintering additive. However, LiF has also been shown to impart undesirable properties to the polycrystalline articles. For example, when LiF is used as a sintering additive in magnesium alumina powder staring materials, the grain size within the sintered article is demonstrably larger than in materials not treated with LiF. This increase in grain size is considered to be an undesirable side effect, since it changes the physical and mechanical properties of the polycrystalline articles. Additionally, LiF is a hazardous chemical, and its use is undesirable for health and environmental reasons. The vacuum treatment methods herein avoid the need for LiF, and provide a powder that, upon sintering, forms polycrystalline articles having desirable grain size, structure, and optical properties than rival those of single crystalline spinels.

Without being limited by theory, we believe the effectiveness of the purification methods results from our ability to reduce the pressure on the powder (at a specific temperature) below the saturated vapor pressure of the impurities. This would induce a phase change in the impurities from the solid state directly to vapor and thereby facilitate removal of the impurity from the powders. The underlying principal is similar to the freeze-drying process. By way of explanation, freeze-drying is used to remove water from suspensions or slurries without heating the material to 100° C. (boiling point of water). In freeze drying, a suspension/slurry is cooled below 0° C. (freezing temperature for water) and ice is directly converted to water vapor and removed from the suspension/slurry by creating a vacuum over the material. In our methods and processes, a similar principle is used to remove the impurities from the powders. Based on this hypothesis, temperature is also expected to have an effect on the amount of vacuum, as well as the amount of time, required to remove the impurities. We are currently exploring the effect of temperature on those and other processing parameters. We also speculate that any procedure such as stirring or mixing the powders would expose fresh surfaces and make the decontamination process faster.

In summary, the inventors have proved that their vacuum treatment methods and apparatus can successfully decontaminate commercial spinel powders and reduce the batch-to-batch variation of such impurities in these powders. The resulting purified powders can be densified to obtain desired optical and mechanical properties without the aid of any sintering aids (such as LiF), thereby avoiding the associated grain growth and degradation of mechanical properties caused by use of such aids. The effect of several method process parameters (such as temperature, pressure/vacuum, and time) may be further optimized, such as for particular starting material powders of varying ceramic oxide ingredients and contaminants, as well as for various sample sizes. The method contemplates added, yet optional steps, such as heating/cooling of the gas/vapor stream, stirring and/or mixing the sample at various stages and times, whether to shorten processing time or to improve purity, or both.

In any case, the discovery herein that the methods further purify the purest commercially-available powder starting materials for forming crystalline articles is surprising, and meets the longstanding, hard sought need of the industry for purer, nearly theoretically transparent and nearly colorless spinels. The resulting purified starting material produces unprecedented nearly perfectly colorless and highly transparent polycrystalline articles of uncompromised mechanical and chemical integrity. For example, the articles produced from our purified powder starting materials are colorless to the human eye, whereas articles made from Baikowski S30CR have a visible color tint that was heretofore thought to be unavoidable by the industry experts, and was certainly unavoidable without use of LiF or other sintering aids.

While the principles of the invention have been described above in connection with preferred embodiments, it is to be clearly understood that this description is made only by way of example and not as a limitation of the scope of the invention.

The invention claimed is:

1. A method of providing a purified ceramic powder, the method comprising the steps of:
   a. providing a ceramic powder starting material comprising a crystalline oxide of a ceramic material and at least one chemical contaminant that is not a crystalline oxide of a ceramic material; and
   b. subjecting the ceramic powder starting material to a vacuum for a time sufficient to remove at least a portion of the at least one chemical contaminant from the starting material and to thereby provide a purified ceramic powder.

2. The method of claim 1, wherein the at least one chemical contaminant comprises at least one element selected from the group consisting of Li, Be, B, F, Na, Mg, Al, Si, P, S, Cl, K, Ca, Sc, Ti, V, Cr, Mn, Fe, Co, Ni, Cu, Zn, and Ga.

3. The method of claim 1, wherein the vacuum is between about $10^{-1}$ torr and $10^{-8}$ torr, and wherein the time sufficient to remove a portion of the at least one contaminant is between about 1 hour to about 200 hours, and wherein the method optionally further comprises heating the ceramic powder starting material to a temperature of less than about 500° C.

4. The method of claim 3, wherein the step of heating the ceramic powder starting material is performed concurrently with the step of subjecting the ceramic powder starting material to a vacuum atmosphere.

5. The method of claim 1, wherein the purified ceramic powder consists of at least 99.9% pure crystalline oxides of one or more ceramic materials by weight.

6. The method of claim 5, wherein the crystalline oxides of one or more ceramic materials comprises magnesium aluminate ($MgAl_2O_4$).

7. The method of claim 1, wherein the ceramic powder starting material consists of at least 95% crystalline ceramic oxide by weight, the remainder being at least one chemical contaminant that is not a crystalline oxide of a ceramic material.

8. The method of claim 7, wherein the purified ceramic powder is at least 99% pure magnesium aluminate ($MgAl_2O_4$) by weight.

9. The method of claim 1, wherein the purified ceramic powder has impurities of less than 2000 ppm.

10. The method of claim 1, further comprising the step of processing the purified ceramic powder to form a polycrystalline article having at least 80% transparency.

11. The method of claim 10, wherein the step of further processing the purified ceramic powder to form a polycrystalline article having at least 80% transparency does not require any use of LiF or other sintering additives.

12. The method of claim 11, wherein the polycrystalline article is colorless to the human eye.

13. A method of providing a purified ceramic powder, the method comprising the steps of:

a. providing a ceramic powder starting material comprising at least one crystalline oxide of a ceramic material, the crystalline oxide of the ceramic material being at least 98% pure crystalline oxide by weight; and
b. subjecting the ceramic powder starting material to vacuum and a selected temperature for a time sufficient to remove at least one chemical contaminant from the starting material and to thereby provide a purified ceramic powder being comprising at least 99% pure crystalline oxide by weight and having impurities of less than about 2000 ppm.

14. The method of claim 13, wherein the step of subjecting the ceramic powder starting material to a vacuum further comprises heating the starting material to a temperature of between about 100° C. to about 500° C., and wherein the vacuum provided is between about $10^{-1}$ and $10^{-8}$ Torr.

15. The method of claim 13, wherein the crystalline oxide of a ceramic material comprises magnesium aluminate ($MgAl_2O_4$).

16. The method of claim 13, wherein the crystalline oxide of a ceramic material consists of magnesium aluminate ($MgAl_2O_4$).

17. The method of claim 13, further comprising the step of processing the purified ceramic powder into a polycrystalline article having at least 80% transparency.

18. The method of claim 17, wherein the step of processing the purified ceramic powder includes heating the purified ceramic powder at temperature sufficient for calcination of the powder under vacuum, followed by hot-pressing at a temperature of at least 1000° C. under pressure sufficient to yield the polycrystalline article.

19. A method of providing a purified ceramic powder, the method comprising the steps of:
a. providing a ceramic powder starting material comprising a crystalline oxide of a ceramic material and at least one chemical contaminant that is not a crystalline oxide of a ceramic material; and
b. subjecting the ceramic powder starting material to a vacuum for a time sufficient to remove at least a portion of the at least one chemical contaminant from the starting material and to thereby provide a purified ceramic powder starting material consisting of crystalline oxides and less than 2000 ppm of the at least one chemical contaminant, wherein the at least one chemical contaminant comprises at least one element selected from the group consisting of Li, Be, B, F, Na, Mg, Al, Si, P, S, Cl, K, Ca, Sc, Ti, V, Cr, Mn, Fe, Co, Ni, Cu, Zn, and Ga, and wherein the vacuum is between about $10^{-1}$ torr and $10^{-8}$ torr, and
wherein the time sufficient to remove at least one contaminant is between about 1 hour to about 200 hours.

\* \* \* \* \*